UNITED STATES PATENT OFFICE.

HEINRICH THRON, OF FRANKFORT-ON-THE-MAIN, GERMANY, ASSIGNOR TO VEREIN-IGTE CHININFABRIKEN ZIMMER & CO., G. M. B. H., OF FRANKFORT-ON-THE-MAIN, GERMANY, A SOCIETY OF GERMANY.

QUININ ESTER.

978,792.  Specification of Letters Patent.  Patented Dec. 13, 1910.

No Drawing.  Application filed March 30, 1910. Serial No. 552,369.

*To all whom it may concern:*

Be it known that I, HEINRICH THRON, a subject of the German Emperor, and resident of Frankfort-on-the-Main, Germany, have invented certain new and useful Improvements in Quinin Esters, of which the following is a specification.

This invention relates to the making of organic acid esters of the hydrohalogenic addition products of quinin by coupling together hydrohalogenic acids with the organic acid esters of quinin, and the new products obtained thereby. These products are useful, because their hydrohalogenic acid is bound in an intramolecular way, so that they combine with the action of the quinin the action of their halogen, and because they are tasteless. The said coupling together may be carried out in practice in various ways, as shown by the following examples.

*Example 1. Making of hydrochlorquinin ethyl carbonic acid esters.*—3.605 kilograms of hydrochlorquinin (1 mol.) are mixed with 20 kilograms of benzene, 1.085 kilograms of chlor-formic ethyl-ester (1 mol.) are added, whereupon the whole is heated a short time at boiling temperature. After cooling the product is extracted by means of hydrochloric acid, precipitated with ammonia and crystallized out of diluted alcohol. The reaction takes place according to the following equation:

(Hydrochloroquinin)

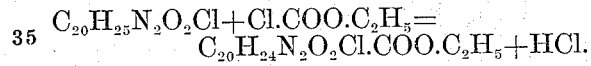

Thereby the hydrochlorquinin-ethylcarbonate is obtained in the form of fine, colorless and tasteless needles which are easily soluble in chloroform, aceton and hot alcohol, and insoluble in petroleum-benzin and water. The melting point is 124 degrees centigrade. Hydrochlorquinin-ethylcarbonate is soluble in diluted acids and is precipitated from such solutions by alkalies. The analysis showed 8.2 per cent. of chlorin, while the result of the calculation from

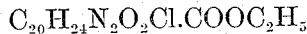

was 8.2 per cent.

*Example 2. Making of hydrochlorisoquinin ethyl carbonic acid ester.*—3.605 kilograms of hydrochlorisoquinin (1 mol.) are dissolved in 20 kilograms of benzene, 0.79 kilograms of pyridin (1 mol.) are added, 1.085 kilograms of chloroformicethylester (1 mol.) are slowly added to the solution, and finally the solution is heated to boiling temperature. The hydrochlorisoquinin employed in this process is represented by the formula

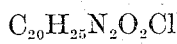

and consists of fine colorless crystal needles, has an intensive bitter taste, is easily soluble in alcohol, ether and chloroform and hardly soluble in petrol-benzin. Its melting point is 183° centigrade. The hydrochlorisoquinin-ethylcarbonate which is thus obtained is extracted by means of diluted hydrochloric acid, precipitated by ammonia, and crystallized from five times the amount of alcohol. The reaction takes place according to the following equation:

(Hydrochlorisoquinin)

Thereby large, colorless and tasteless prisms are obtained which melt at a temperature of from 191 to 192 degrees centigrade, which are easily soluble in benzene, aceton, chloroform, and hot alcohol, but insoluble in petroleum-benzin and water. The diluted solution in sulfuric acid shows a green fluorescence. Hydrochlorisoquinin-ethylcarbonate is soluble in diluted acids, and is precipitated from such solutions by alkalies. The analysis showed 8.33 per cent. of chlorin. The result of the calculation from

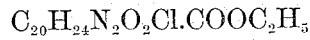

was 8.2 per cent.

*Example 3. Making of hydrobromquinin ethyl carbonic acid ester.*—4.05 kilograms of hydrobromquinin (1 mol.), 4 kilograms of benzene, and 1.085 kilograms of chloroformicethylester (1. mol.) are heated a short time at boiling temperature. From the product of the reaction the hydrobromquinin-ethylcarbonate is extracted by means of diluted sulfuric acid, and the watery solution is shaken with ether and an excess of ammonia. After a short time a colorless crystal powder is precipitated which is removed and crystallized out of alcohol. The reaction takes place according to the following equation:

$$C_{20}H_{25}N_2O_2Br + Cl\cdot COO\cdot C_2H_5 =$$
$$C_{20}H_{24}N_2O_2Br\cdot COOC_2H_5 + HCl.$$

Thereby hydrobromquinin-ethylcarbonate is obtained in colorless and tasteless prisms which are decomposed at a temperature of from 168 to 169 degrees centigrade. It is easily soluble in chloroform, benzene, aceton and hot alcohol, insoluble in petroleum-benbin and water. By diluted acids it is dissolved and is precipitated from such solutions by means of alkalies. The analysis showed 16.6 per cent. of bromin. The result of the calculation from $$C_{20}H_{24}N_2O_2Br\cdot COOC_2H_5$$

was 16.77 per cent.

*Example 4. Making of hydrobromquinin salicylic acid ester.*—A solution of 1 kilogram of salicylic acid quininester in 5 kilograms of hydrobromic acid (specific gravity 1.78) is kept 8 days in the refrigerator. Thereupon ether and an excess of ammonia are added, and the mixture is shaken until the precipitate is completely dissolved. The reaction takes place according to the following equation:

$$C_{20}H_{23}N_2O_2\cdot CO\cdot C_6H_4OH + HBr =$$
$$C_{20}H_{24}N_2O_2Br\cdot CO\cdot C_6H_4OH.$$

By evaporating the etheric solution and grinding the residue hydrobromquinin-salicylic acid ester is obtained in the form of a colorless and tasteless powder. When treated with iodin, hydroiodic acid and sulfuric acid it gives a light brown herapathit. It is very easily soluble in benzene, aceton, hot alcohol, and chloroform, insoluble in petroleum-benzin and water. In diluted acids the hydrobromquinin-salicylic-acid ester is dissolved and precipitated from such solutions by alkalies. It melts at a temperature of from about 106 to 114 degrees centigrade. The analysis showed 15.2 per cent. of bromin. The result of the calculation for $$C_{20}H_{24}N_2O_2Br\cdot CO\cdot C_6H_4OH$$

was 15.45 per cent.

It will be seen that all of the products hereinbefore described conform to the following general formula, namely,—

$$C_{20}H_{24}N_2O_2\cdot x\cdot y.$$

in which "$x$" indicates either Cl or Br, and "$y$" indicates a radical of an organic acid, and that such products are colorless and tasteless, are easily soluble in benzene, chloroform, aceton, and hot alcohol, and insoluble in petroleum-benzin and water, and when dissolved in diluted acids are precipitated from such solution by the action of alkalies.

My hydrohalogenic addition product of quinin contains the halogen in fast or close combination with the carbon. Neither nitrate of silver or ammonia act in the cold on the so bound halogen.

Having now described my invention and the manner in which it may be carried out in practice, I wish it to be understood that I do not confine it to the exact examples given, which may vary within wide limits by using other means well known as equivalents by men skilled in the art.

I claim:

1. The herein described process of making organic acid esters of the hydrohalogenic addition products of quinin consisting in coupling hydrohalogenic acids with the organic acid esters of quinin.

2. The herein described process of making the salicylic acid ester of hydrobromquinin which consists in coupling hydrobromic acid with salicylic acid quinin ester.

3. The herein described organic acid esters of the hydrohalogenic addition products of quinin having the general formula $$C_{20}H_{24}N_2O_2\cdot x\cdot y.$$

in which $x$ is a halogen and $y$ the radical of an organic acid ester, the said halogen being in such close combination that it is not acted on in the cold by either nitrate of silver or ammonia, said esters being colorless and tasteless bodies easily soluble in benzene, chloroform, aceton, and hot alcohol, and insoluble in petroleum-benzin and water, and when dissolved in diluted acids being precipitated from such solutions by the action of alkalies.

4. The herein described salicylic acid ester of hydrobromquinin having the formula $$C_{20}H_{24}N_2O_2Br\cdot CO\cdot C_6H_4OH.,$$

being a colorless and tasteless powder easily soluble in benzene, aceton, hot alcohol and chloroform, insoluble in petroleum-benzin and water, and when dissolved in diluted acids being precipitated from such solutions by the action of alkalies.

In testimony whereof I have signed my name to this specification in the presence of two subscribing witnesses.

HEINRICH THRON.

Witnesses:
 JEAN GRUND,
 CARL GRUND.